United States Patent [19]
Collins

[11] Patent Number: 5,961,692
[45] Date of Patent: *Oct. 5, 1999

[54] SYSTEM AND METHOD OF IMPROVING PERFORMANCE OF A GAS MEMBRANE DEHYDRATOR

[75] Inventor: D. Stephen Collins, Bridgton, Me.

[73] Assignee: Howell Laboratories, Inc., Bridgton, Me.

[*] Notice: This patent issued on a continued prosecution application filed under 37 CFR 1.53(d), and is subject to the twenty year patent term provisions of 35 U.S.C. 154(a)(2).

[21] Appl. No.: 08/799,383

[22] Filed: Jan. 30, 1997

[51] Int. Cl.$^6$ .................................................. B01D 53/22
[52] U.S. Cl. .................. 95/45; 95/52; 95/54; 96/8
[58] Field of Search .................. 95/45, 52, 54; 96/8

[56] References Cited

U.S. PATENT DOCUMENTS

| | | | |
|---|---|---|---|
| 3,735,558 | 5/1973 | Skarstrom et al. | 95/52 |
| 4,931,070 | 6/1990 | Prasad | 95/52 |
| 4,934,148 | 6/1990 | Prasad et al. | 95/52 |
| 5,084,073 | 1/1992 | Prasad | 95/52 |
| 5,108,464 | 4/1992 | Friesen et al. | 95/52 |
| 5,185,014 | 2/1993 | Prasad | 95/52 |
| 5,205,842 | 4/1993 | Prasad | 95/52 |
| 5,605,564 | 2/1997 | Collins | 95/52 |

*Primary Examiner*—Jay H. Woo
*Assistant Examiner*—Minh-Chau T. Pham
*Attorney, Agent, or Firm*—Samuels, Gauthier & Stevens

[57] ABSTRACT

An uncontrollable dehydrator where the uncontrollable discharge is augmented with a purge gas to increase the capacity of the dehydrator to achieve a target flow rate and dew point.

10 Claims, 1 Drawing Sheet

SYSTEM AND METHOD OF IMPROVING PERFORMANCE OF A GAS MEMBRANE DEHYDRATOR

FIELD OF THE INVENTION

The invention relates to a membrane gas (air) dehydrator.

BACKGROUND AND BRIEF SUMMARY OF THE INVENTION

In many process applications, the composition of a gas must be carefully controlled to ensure that certain components in the gas are below a predetermined level or absent from the gas. Typically, the purified gaseous streams are either used as a component in a process operation, e.g. fluidic control systems, or to create an environment free of particular components, e.g. semiconductor chip manufacture. There are various systems available in the prior art to control the presence of undesirable components below a certain level.

Typically in prior art membrane gas dehydrators, compressed gas containing a permeate to be removed enters an inlet plenum at an elevated pressure. The gas then flows through the interior of a plurality of membrane capillary fibers. The size of the fiber pores allows the passage of the permeate but retards the passage of the gas. The permeate depleted gas enters the system for which it is designed.

The permeate is driven through the membrane walls by the difference in permeate vapor pressure between the inside (tube side) and outside (shell side) of the fibers. If no modifications are made to the system, the shell side of the fibers becomes permeate rich and the vapor pressure differential decreases.

In order to maintain a high vapor pressure differential the permeate is removed from the shell side of the fibers. It is conventional to provide a sweep stream or purge gas for this purpose. Typically a bypass stream of the permeate-depleted gas is recycled to purge the shell side.

Some membrane gas dehydrators are designed for 'uncontrollable' discharge of the gases to the shell side. These dehydrators allow some gas to pass through the fibers along with the permeate. The required purge is created by simply venting the shell side to ambient. If the permeate being removed is corrosive, flammable, toxic, expensive or otherwise undesirable to exhaust to ambient a more sophisticated system which is less cost effective must be used.

My copending application Ser. No. 08/689,901 filed Aug. 15, 1996 overcomes this problem. A purge gas is used with this type of dehydrator, which purge gas is especially selected to neutralize the deleterious effects of the purge discharge while sweeping the shell side.

Another problem with this type of dehydrator is that with inlet conditions of pressure and moisture content (dewpoint) fixed, the moisture content of the outlet gas is determined by the balance between total flow rate and purge flow rate. The higher the ratio of total flow rate to purge flow rate, the higher the moisture content or dewpoint of the outlet air and contrariwise.

The purge flow rate is a fixed value at a given operating pressure. The outlet dewpoint will vary directly as the total flow. With a prior art dehydrator, operating at 80 psig and 60° F. inlet dewpoint, the dehydrator delivers outlet dewpoints according to the following table:

TABLE

| TOTAL FLOW Standard cu ft/min | PURGE FLOW Standard cu ft/min | NET FLOW (Total - Purge) | OUTLET DEWPOINT °F. |
|---|---|---|---|
| 22.0 | 2.7 | 19.3 | 40 |
| 13.1 | 2.7 | 10.4 | 20 |
| 10.0 | 2.7 | 7.3 | 0 |
| 8.4 | 2.7 | 5.7 | −20 |
| 7.3 | 2.7 | 4.6 | −40 |

From this table it can be seen that if a process requires a net flow greater than 4.6 SCFM with an output dewpoints of −40° F., two dehydrators would have to be operated in parallel. Parallel operation of multiple elements does provide increased outlet capacity, but at increased capital cost and with purge losses increased by multiples of the number of elements used. My present invention overcomes this problem.

The present invention is directed to an improvement in membrane dehydrators of the type based on 'uncontrollable' discharge of gases from the shell side directly to ambient.

Broadly my invention comprises a system and method to modify the discharge characteristics on the shell side of an 'uncontrollable' dehydrator to increase the capacity of the dehydrator. The invention comprises a dehydrator having a housing, a membrane disposed within the housing, the membrane defining a shell side and a tube side. An inlet introduces a gas into the tube side, the permeate and a portion of the gas flow through the walls of the tubes into the shell side. An outlet vents the shell side to ambient. A purge gas is introduced into the shell side and mixed with the permeate rich gas to increase the efficiency and performance of the dehydrator.

In the method of the invention, if the dehydrator as designed does not have the capacity to provide a desired target flow rate and dewpoint, the uncontrollable discharge is augmented with a purge gas, to increase the capacity of the dehydrator to achieve the target flow rate and dewpoint.

DESCRIPTION OF THE PREFERRED EMBODIMENT(S)

Figure 1:
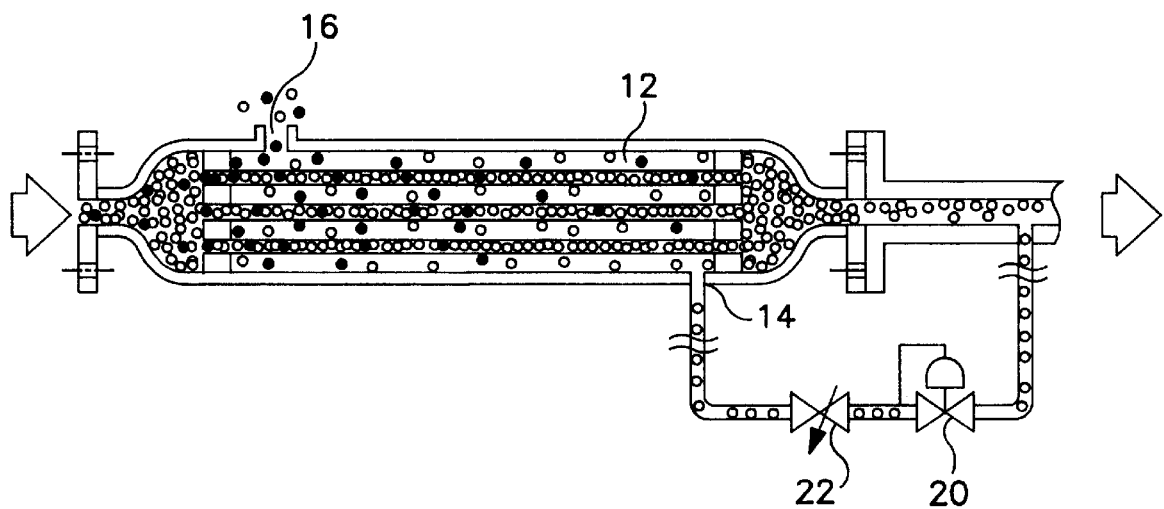
FIG. 1 is a schematic illustration of a preferred embodiment of the invention.
Figure 2:
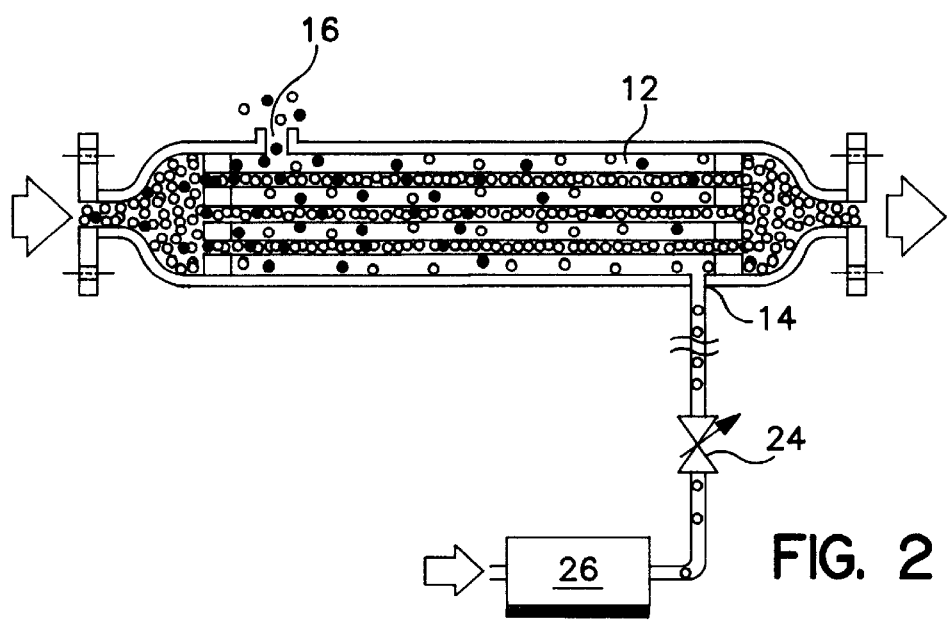
FIG. 2 is a schematic illustration of an alternative embodiment of the invention.

Referring to FIGS. 1 and 2, a system embodying the invention is shown and uses a separate source of purge gas to augment the uncontrollable discharge to increase the capacity of a membrane dehydrator.

Either the outlet (product) gas from the dehydrator itself or a separate, external source of dry gas can be used, as shown in FIGS. 1 and 2, respectively. The addition of the extra purge flow increases the capacity of the element at a given outlet dewpoint. A prior art membrane system is shown generally at 10 and comprises a shell side 12 and an outlet 16 for the uncontrollable discharge of the permeate rich gas.

Referring to FIG. 1, the desired increase in purge gas flow is achieved through a pressure regulator 20 and an adjustable throttle valve 22 which control the amount of outlet gas bypassed into the shell side through a inlet 14 for the increased purge gas flow.

Referring to FIG. 2, the increase in purge gas flow is provided by an air dehydrator 26, such as a Howell Labs Model 3200, in combination with a throttle valve 24.

Referring to Paragraph 1 above, it is seen that for the prior art dehydrator under the stipulated inlet conditions and −40° F outlet dewpoint, the throughput is 4.6 SCFM net flow. If, for example, 5 SCFM net output were required at the same −40° F dewpoint, it would be necessary to parallel a second element, doubling the capital cost and doubling the purge loss from 2.7 to 5.4 SCFM.

By application of the present invention, approximately 0.7 SCFM of additional purge gas at a pressure of 5 psig or greater and with a dewpoint of −40° F or lower increases the net output to 5 SCFM. There is little or no increase in capital cost and the purge loss is increased from 2.7 SCFM to only 3.4 SCFM.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A method for improving the capacity of an uncontrollable discharge shell and tube membrane dehydrator comprising:

flowing a feed stream into the tube side of the dehydrator, the feed stream comprising a gas containing a permeate to be removed to lower the dew point of the gas to a target dew point;

flowing the feed stream in the range of from 12.27% by volume to 36.9% by volume through the walls of the tube(s) into the shell side, said flow through the walls of the tubes comprising an uncontrollable purge stream;

discharging the gas from the dehydrator at a target dew point;

introducing a controlled purge stream into the shell side to augment the uncontrollable purge stream, said controlled purge stream having a dew point lower than that of the feed stream; and increasing the flow rate of the feed stream flowing through the dehydrator while maintaining the dew point of the gas discharged from the dehydrator at the target dew point.

2. The method of claim 1 which comprises:

bypassing a portion of the outlet gas to form at least a portion of the purge stream.

3. The method of claim 2 which comprises:

controlling the flow rate of the purge gas introduced into the shell side.

4. The method of claim 1 which comprises:

dehydrating the purge gas prior to introducing the purge gas into the shell side.

5. The method of claim 4 which comprises:

controlling the flow rate of the purge gas.

6. A system for improving the capacity of an uncontrollable discharge shell and tube membrane dehydrator comprising:

means for flowing a feed stream into the tube side of the dehydrator, the feed stream comprising a gas containing a permeate to be removed to lower the dew point of the gas to a target dew point;

means for flowing the feed stream in the range from 12.27% by volume to 36.9% bv volume through the walls of the tube(s) into the shell side, said flow through the walls of the tubes comprising an uncontrollable purge stream;

means for discharging the gas from the dehydrator at a target dew point;

means for introducing a controlled purge stream into the shell side to augment the uncontrollable purge stream, said controllable purge stream having a dew point lower than that of the feed stream whereby the flow rate of the gas flowing through the dehydrator is increased while the dew point of the gas discharge from the dehydrator is maintained at the target dew point.

7. The system of claim 6 which comprises:

means to bypass a portion of the outlet gas to form at least a portion of the purge gas.

8. The system of claim 7 which comprises:

means to control the flow rate of the purge gas introduced into the shell side.

9. The system of claim 6 which comprises:

means to dehydrate the purge stream prior to introducing the purge stream into the shell side.

10. The system of claim 9 which comprises:

means to control the flow rate of the purge gas.

* * * * *